United States Patent [19]
Eaton et al.

[11] Patent Number: 6,050,221
[45] Date of Patent: Apr. 18, 2000

[54] BIRD FEEDER

[76] Inventors: Lorraine E. Eaton; Walter G. Eaton, Jr., both of R.R. #3, Box 361, Schoharie, N.Y. 12157

[21] Appl. No.: 09/264,537

[22] Filed: Mar. 8, 1999

[51] Int. Cl.[7] .................................................. A01K 39/01
[52] U.S. Cl. ......................................... 119/57.9; 119/52.3
[58] Field of Search .................................. 119/52.2, 52.3, 119/52.4, 57.8, 57.9

[56] References Cited

U.S. PATENT DOCUMENTS

| | | | |
|---|---|---|---|
| 2,230,058 | 1/1941 | Hornung . | |
| 3,126,870 | 3/1964 | Matthew | 119/57.8 |
| 4,207,839 | 6/1980 | Barry . | |
| 4,649,865 | 3/1987 | Riggi . | |
| 5,048,461 | 9/1991 | Wessner . | |
| 5,189,984 | 3/1993 | Smith | 119/52.2 |
| 5,375,558 | 12/1994 | Drakos . | |
| 5,676,089 | 10/1997 | Morganson . | |
| 5,823,135 | 10/1998 | Gilchrist et al. | 119/52.2 |
| 5,894,814 | 4/1999 | Roslonski | 119/57.9 |

*Primary Examiner*—Thomas Price
*Attorney, Agent, or Firm*—Schmeiser, Olsen & Watts

[57] ABSTRACT

A bird feeder that prevents animals such as squirrels, chipmunks, and rodents from gaining access to feed in the bird feeder. The bird feeder protects the feed from wind, rain, and snow. The bird feeder includes a housing that is rotatably attached to a support shaft allowing at least 360 degrees of rotation. The housing includes a plurality of angled plates that cause the housing to spin when the animal contacts one of the plates. A feed tray is rigidly attached to the support shaft and remains upright and stationary within the housing while the housing rotates about the support shaft. A bird can fly through an opening directly to the feed tray. Transparent sides of the housing allows a person to watch the bird.

22 Claims, 4 Drawing Sheets

BIRD FEEDER

FIELD OF THE INVENTION

The present invention relates generally to bird feeders, and more particularly relates to bird feeders that prevent squirrels, chipmunks and other animals from feeding on the bird feed.

BACKGROUND OF THE INVENTION

Bird feeders are well known in the art. It is well known that bird feeders not only attract birds, but also undesirable animals such as squirrels and chipmunks. Bird feeders have been disclosed employing various methods to discourage undesirable animals from feeding on the bird feed. Devices to discourage animals have used self closing feed ports, doors to block access, and the application of high voltage. Squirrels are a major nuisance and can even destroy the bird feeder during attempts to reach the bird feed. Also, squirrels are extremely persistent and will repeatedly attack the bird feeder.

SUMMARY OF THE INVENTION

The present invention provides a bird feeder that prevents animals such as squirrels and chipmunks from gaining access to the bird feed in the bird feeder. The bird feeder protects the bird feed from wind, rain, and snow, and catches bird feed that a bird might spill.

The bird feeder includes a housing that is rotatably attached to a support shaft. A plurality of support elements are attached to the support shaft, and are attached to an external support system by flexible connectors such as rope, wire, etc. The external support system can include for example a rod or a branch of a tree. A feed tray is rigidly attached to the support shaft. The housing is free to rotate greater than 360 degrees about the support shaft. When an animal contacts the housing, the weight of the animal causes the housing to spin and shed the animal off the housing. The feed tray remains upright and stationary within the housing while the housing rotates about the support shaft.

The housing includes side walls that are preferably transparent. In addition, the housing includes a top plate and a bottom plate. The top and bottom plates include a plurality of upwardly and downwardly angled protruding portions that cause the housing to spin when the animal contacts one of the protruding portions. The top and bottom plates are formed from a hard smooth-surfaced material such as aluminum or plastic to prevent an animal from gripping the surface with its claws. In addition, the bottom plate includes a counterweight so that after spinning, the housing will always return to the same at rest orientation.

The housing includes an opening in each end. A bird can fly through either opening and can land directly on the feed tray. The feed tray includes a plurality of side walls and a base for containing the feed. In addition, the feed tray includes an upper flat surface that provides a perch on which the bird can land and stand on for feeding. To leave the bird feeder, the bird flies out through one of the openings in the housing. The feed tray can also include a lower counterweight to help maintain the feed tray in an upright position when strong winds blow against the feed tray. Thus, bird feed is prevented from spilling because the feed tray always remains in an upright position.

Filling the feed tray with food such as bird seed is accomplished by rotating the housing until one of the openings is in an upward location. Next, bird feed can be easily poured into the feed tray. The transparent side walls enable a person to easily see how much food is in the feed tray.

The bird feeder can be mounted from the branch of a tree or from the rod. The rod can be attached to a vertical pole. Preferably the branch or the rod are essentially horizontal in orientation. Flexible connectors such as a length of rope, wire, twine, or other suitable material can be used to tie or attach the support elements to the branch or to the rod. Preferably the bird feeder is mounted at least about 4 feet away from the nearest vertical element such as a tree trunk. This distance prevents the animal from leaping directly from the tree trunk to the feed tray without touching the rotatable housing.

In addition, the bird feeder is preferably mounted from a branch or rod that is at least about six feet above a ground surface. This distance above the ground surface ensures that an animal will not leap from the ground into the bird feeder. The support shaft of the bird feeder is preferably mounted at least about 25 inches from the branch or rod. This distance allows the housing to rotate freely beyond 360 degrees. The distance between the support shaft and the opening in each end of the bird feeder is at least about 9 inches. This distance prevents animals such as a squirrel from being able to crawl from the support element attached to the end of the support shaft into one of the openings of the housing.

Another embodiment of the bird feeder includes a feed tray having a support shaft attached directly to two side walls. In addition, each end of the support shaft is attached directly to a flexible cable.

In the preferred embodiment of the present invention, the sides of the housing are transparent allowing people to clearly see birds flying into the bird feeder, feeding, and flying out of the bird feeder. Also, it can be very entertaining watching animals such as squirrels trying to reach the bird feed. Often a squirrel will climb a tree, run out on the branch supporting the bird feeder, climb down the flexible connector and support element toward the bird feeder, and jump onto the rotatable housing. The rotatable housing will spin as soon as the squirrel makes contact with the housing, causing the squirrel to fall to the ground. Thus, the squirrel never reaches the bird feed. Many times, the squirrel will climb the tree and repeat the process over and over. The squirrel is the animal referred to in this example, however, it should be appreciated that other nuisance animals fall within the scope of this invention. Examples include chipmunks, mice, and other rodents.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
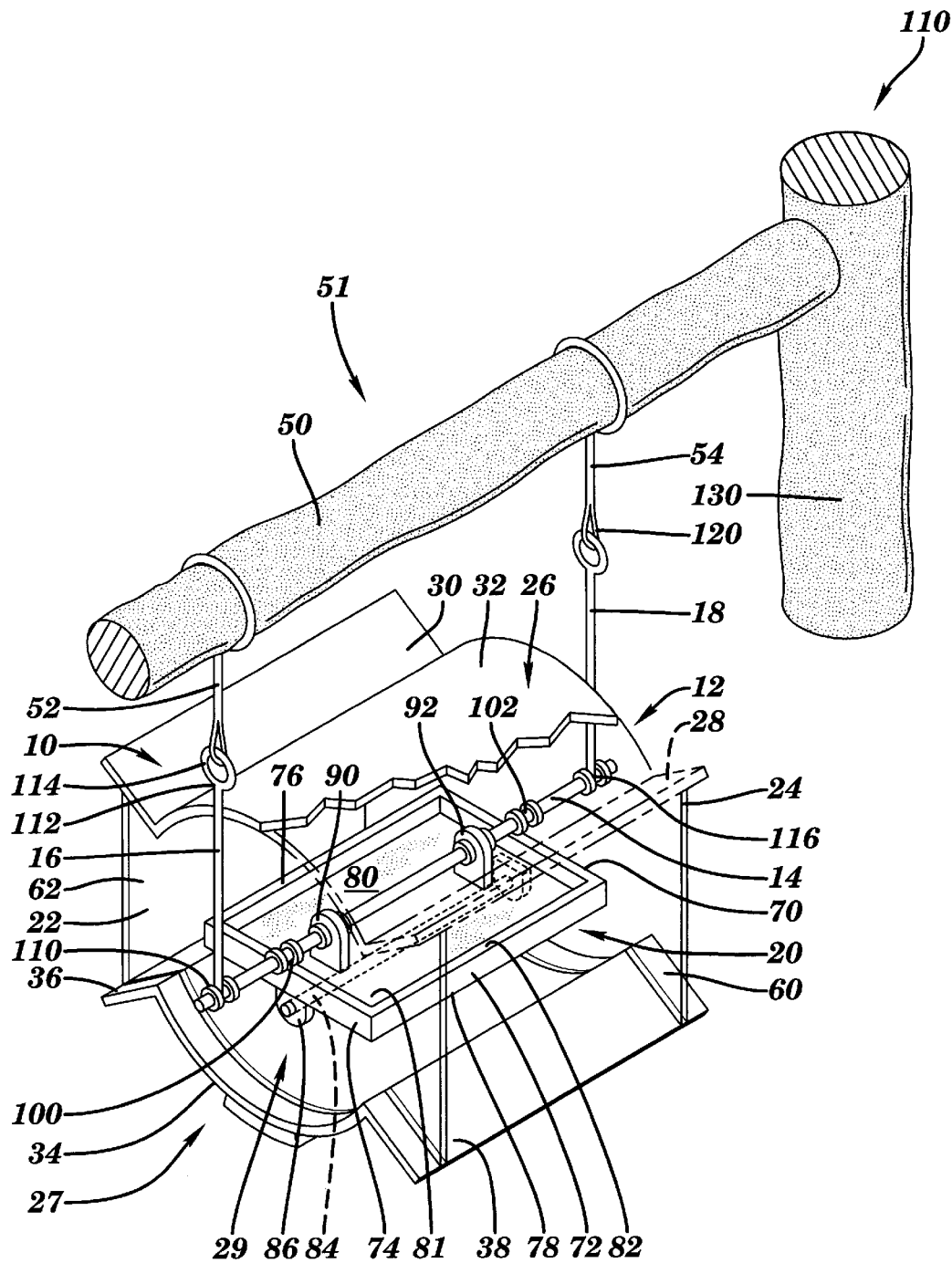
FIG. 1 is a perspective view of a bird feeder in accordance with a preferred embodiment of the present invention.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings.

Figure 3:
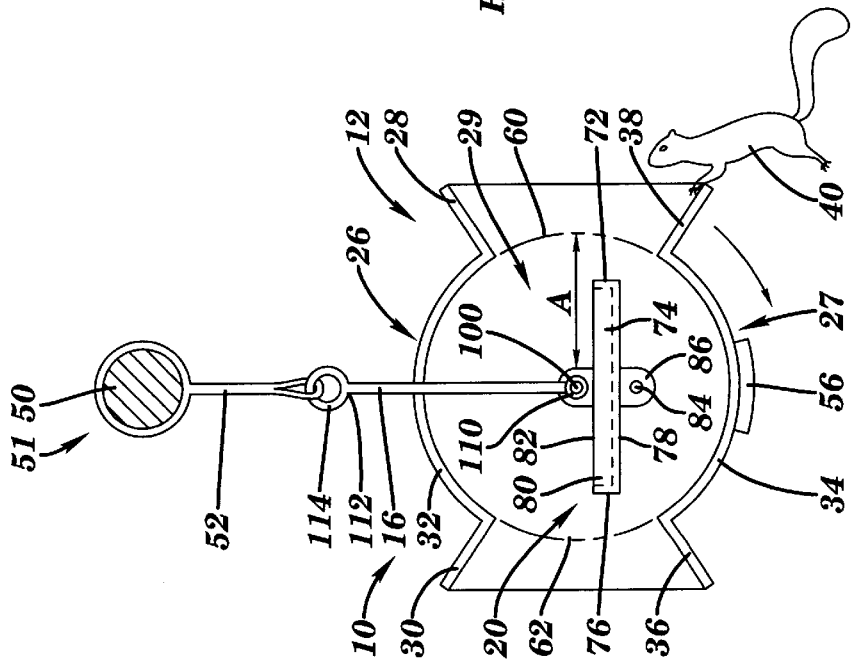
FIG. 3 is a side view of the bird feeder with an animal sliding off a protruding portion of a housing.

Referring to FIG. 1, there is illustrated a perspective view of the bird feeder 10 in accordance with the present invention. The bird feeder 10 includes a housing 12, a support shaft 14, a support element 16, a support element 18, and a feed tray 20. The housing 12 is free to rotate greater than 360 degrees about the support shaft 14. The feed tray 20 is rigidly attached to the support shaft 14. The bird feeder 10 is attached to an external support system 51. The external support system 51 can preferably include an essentially horizontal branch 50. The support elements 16 and 18 are attached to the branch 50 of a tree 110 by a flexible connector 52 and a flexible connector 54. The flexible connectors 52 and 54 are preferably formed of rope, however, it should be appreciated that many other materials such as wire or twine can be used. The housing 12 includes a side wall 22, a side wall 24, a top plate 26 and a bottom plate 27. The side walls 22 and 24 are preferably formed from a transparent material such as plastic or glass to allow a person to see through the side walls 22 and 24 and observe a bird (not shown) inside the housing 12. The top plate 26 and the bottom plate 27 are attached to the side walls 22 and 24 by suitable means such as by screws, glue, or the like. The top plate 26 and the bottom plate 27 are formed from a hard smooth surfaced material such as aluminum or plastic to prevent an animal 40 from gripping the surface with its claws. As illustrated in FIG. 3, the bottom plate 27 includes a counterweight 56 so that after spinning, the housing 12 will always return to the same at rest orientation with the counterweight 56 located at the bottom of the bird feeder 10. The counterweight 56 is rigidly attached to a lower portion of the bottom plate 27.

Figure 2:
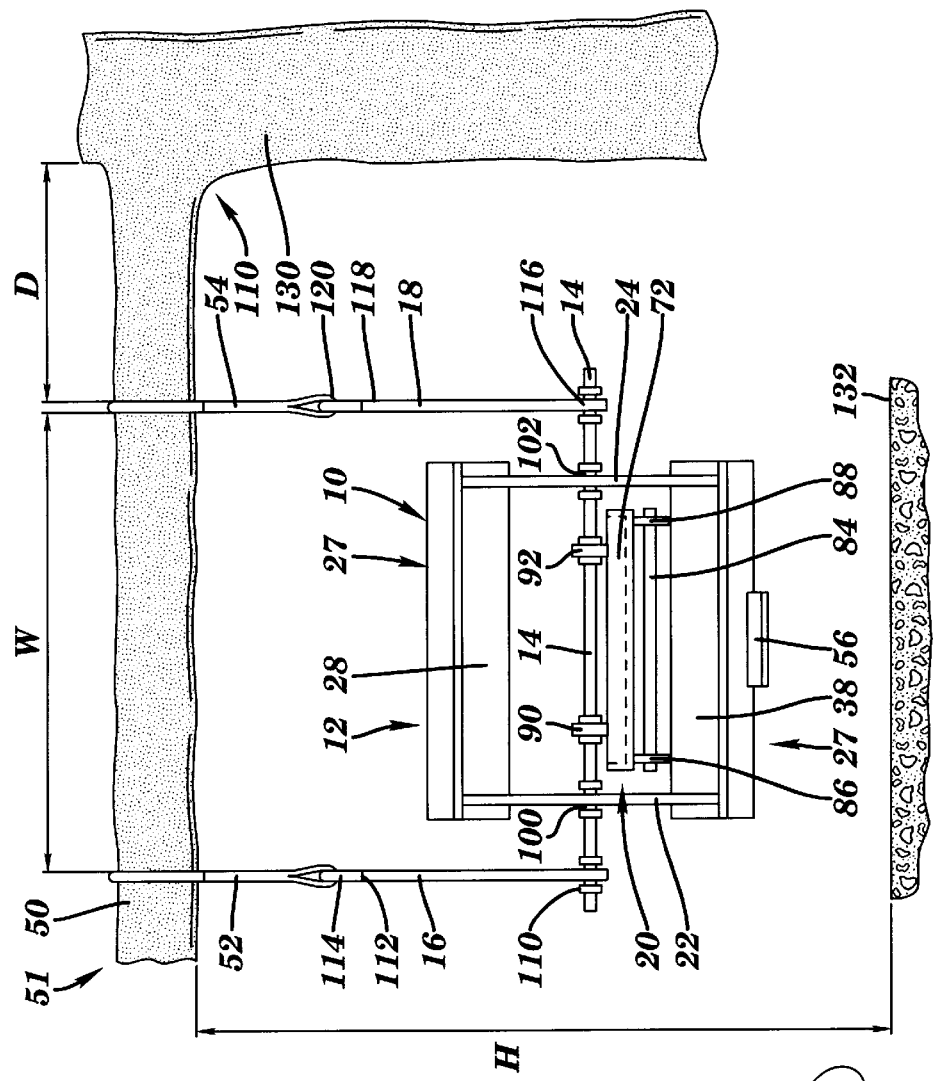
FIG. 2 is a front view of the bird feeder.

As illustrated in FIGS. 1 and 2, the side walls 22 and 24 included in the housing 12 are rotatably attached to the support shaft 14 by a bearing assembly 100 and a bearing assembly 102. The bearing assemblies 100 and 102 allow rotation of the housing 12 about the support shaft 14 while preventing movement of the housing 12 in an axial direction along the axis of the support shaft 14.

The top plate 26 includes a circular surface 32, a protruding portion 28, and a protruding portion 30. The protruding portions 28 and 30 extend upward at an angle from the circular surface 32 (FIG. 3). The bottom plate 27 includes a circular surface 34, a protruding portion 36, and a protruding portion 38. As illustrated in FIG. 3, the protruding portions 36 and 38 extend downward at an angle from the circular surface 34. The protruding portions 28, 30, 36, and 38 cause the housing 12 to rotate when an animal 40 such as a squirrel contacts one of the protruding portions 28, 30, 36, or 38. The protruding portions 28, 30, 36, and 38 are preferably flat, however, many other shapes such as curved, concave or convex shapes can be used.

In the preferred embodiment of the present invention, a cylindrical portion 29 of the housing 12 is formed by the circular surface 32 of the top plate 26 in combination with the side walls 22 and 24 and the circular surface 34 of the bottom plate 27. Preferably in the present invention, the cylindrical portion 29 of the housing 12 is about 12 inches in diameter, and the protruding portions 28, 30, 36, and 38 extend about 4 inches from the cylindrical portion 29.

As illustrated in FIGS. 1 and 3, the housing 12 has an opening 60 and an opening 62. The opening 60 is formed by the upwardly protruding portion 28, the side walls 22 and 24, and the downwardly protruding portion 38. The opening 62 is formed by the upwardly protruding portion 30, the side walls 22 and 24, and the downwardly protruding portion 36. Preferably the openings 60 and 62 are about 8 inches high and about 14 inches wide. A bird (not shown) can fly through either opening 60 and 62 and can land directly on the feed tray 20. The feed tray 20 includes a plurality of side walls 70, 72, 74 and 76 and a base 78. The combination of the side walls 70, 72, 74, 76, and the base 78, form a region 80 for containing bird feed 81 (FIG. 1).

In addition, the feed tray 20 includes a flat upper surface 82 that provides a perch on which a bird can land and stand on for feeding. The flat upper surface 82 is formed by the upper surfaces of the side walls 70, 72, 74, 76, and extends around the entire upper periphery of the feed tray 20. To exit the bird feeder 10, the bird flies directly from the feed tray 20 and out through one of the openings 60 or 62.

In addition, the feed tray 20 includes a lower counterweight 84 to help maintain the feed tray 20 in an upright position when strong winds blow against the feed tray 20. Thus, bird feed 81 is prevented from spilling because the feed tray 20 always remains in an upright position. The lower counterweight 84 is attached to the base 78 by the support elements 86 and 88 (FIGS. 1, 2, and 3). As illustrated in FIGS. 1 and 2, the feed tray 20 is rigidly attached to the support shaft 14 by a bracket 90 and a bracket 92. Thus, the lower counterweight 84 maintains the feed tray 20 in a upright position, while the counterweight 56 attached to the bottom plate 27 returns the rotatable housing 12 to a horizontal orientation.

Filling the feed tray 20 with feed such as bird seed is accomplished by rotating the housing 12 until the opening 60 or the opening 62 is in an upward location. Next, bird feed 81 can be easily poured into the feed tray 20. The transparent side walls 22 and 24 enable a person to easily see how much feed is in the feed tray 20.

As illustrated in FIGS. 1 through 4, the bird feeder 10 can be mounted from the branch 50 of a tree 110. Preferably the branch 50 is essentially horizontal in orientation. A first end 110 of the support element 16 is rigidly attached to the support shaft 14 and a second end 112 of the support element 16 is formed into a loop 114. A first end 116 of the support element 18 is rigidly attached to the support shaft 14 and a second end 118 of the support element 18 is formed into a loop 120. A flexible connector 52 connects the loop 114 of the support element 16 with the branch 50 of the tree 110. A flexible connector 54 connects the loop 120 of the support element 18 with the branch 50 of the tree 110. The flexible connectors 52 and 54 are spaced at a distance "W" of greater than about 18 inches (FIG. 2). This distance "W" prevents the rotating housing 12 from contacting the flexible connectors 52 and 54. The flexible connectors 52 and 54 are preferably made from rope, however, it should be appreciated that many other materials can be used. For example the flexible connectors 52 and 54 can comprise wire or twine. The flexible connectors 52 and 54 are attached by crimping, twisting, or by tying knots.

FIG. 2 illustrates an end view of the bird feeder 10. Preferably the bird feeder 10 is mounted at least a distance "D" of about 4 feet away from the nearest vertical element such as a tree trunk 130. This distance "D" prevents the animal 40 from leaping directly from the tree trunk 130 to the feed tray 20 without touching and causing a rotation of the rotatable housing 12. In addition, the bird feeder 10 is preferably mounted from a horizontal member such as a branch 50 that is at least a height "H" of about six feet above a ground surface 132. This distance "H" above the ground surface 132 ensures that the animal 40 will not leap from the ground surface 132 into the bird feeder 10. The support shaft 14 is preferably mounted at least about 25 inches from the branch 50. This distance from the branch 50 allows the housing 12 to rotate freely beyond 360 degrees. The distance "A" between the support shaft 14 and the opening 60 in the housing 12 is at least about 9 inches (FIG. 3). This distance "A" prevents animals such as a squirrel 40 from being able to crawl from the support element 16, to the support shaft 14, and into the opening 60 of the housing 12. In a similar manner, the distance of at least about 9 inches between the support shaft 14 and the opening 62, likewise prevents the animal 40 from entering the opening 62.

Figure 5:
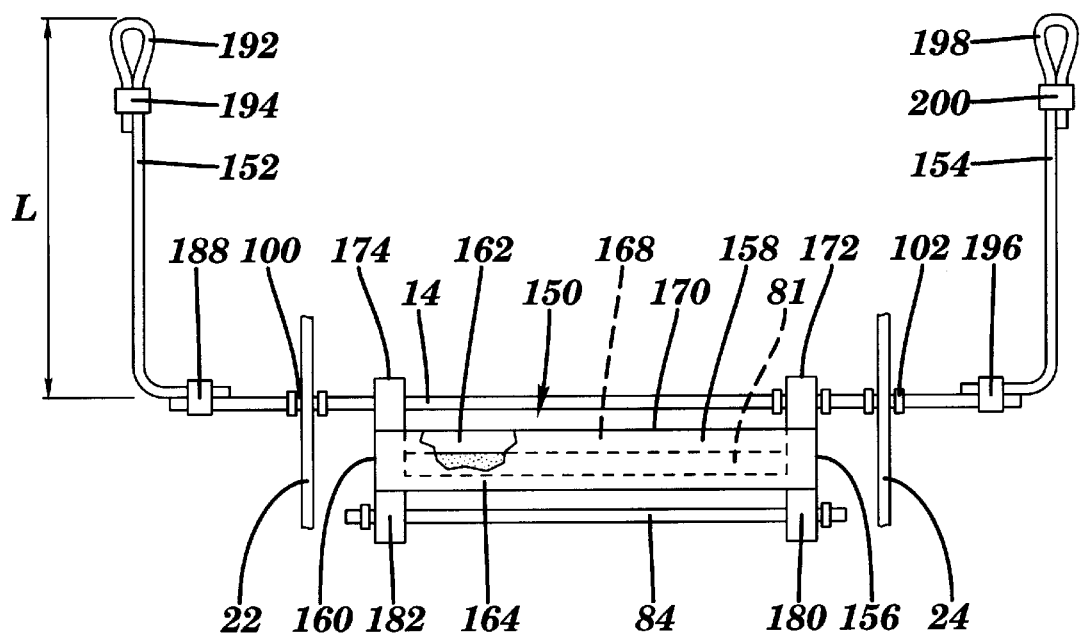
FIG. 5 is an end view of another embodiment of a feed tray and support cables in accordance with the present invention.

FIG. 5 is an end view of another embodiment of a feed tray 150 with a support cable 152, and a support cable 154. The feed tray 150 includes a plurality of side walls 156, 158, 160, 162, and a base 164. The combination of the side walls 156, 158, 160, 162, and the base 164, form a region 168 that contains bird feed 81. In addition, the feed tray 20 includes a flat upper surface 170 that provides a perch on which the bird can land and stand on for feeding. Side walls 156 and 160 include projecting elements 172 and 174 that receive and rigidly attach the support shaft 14 to the feed tray 150. In addition, side walls 156 and 160 include projecting elements 180 and 182 to receive and rigidly attach the lower counterweight 84 to the feed tray 150. The counterweight 84 helps maintain the feed tray 150 in an upright position when strong winds attempt to tip the feed tray 150. Thus, bird feed 81 is prevented from spilling because the feed tray 150 remains in an upright position. The side walls 22 and 24 of the housing 12 are rotatably attached to the support shaft 14 by the bearing assemblies 100 and 102.

A first end of the support cable 152 is rigidly attached to the support shaft 14 by a clamp 188. A second end of the support cable 152 is formed into a loop 192 by rigidly attaching the cable 152 back onto itself by tightening a clamp 194. In a similar manner, a first end of the support cable 154 is rigidly attached to the support shaft 14 by a clamp 196. A second end of the support cable 154 is formed into a loop 198 by rigidly attaching the cable 154 back onto itself by tightening a clamp 200. The flexible connectors 52 and 54 can be used to connect the loops 192 and 198 to the branch 50. The distance "L" of the support cables 152 and 154 is at least about 25 inches as illustrated in FIG. 5. This distance "L" allows the housing 12 to rotate freely beyond 360 degrees.

Figure 4:
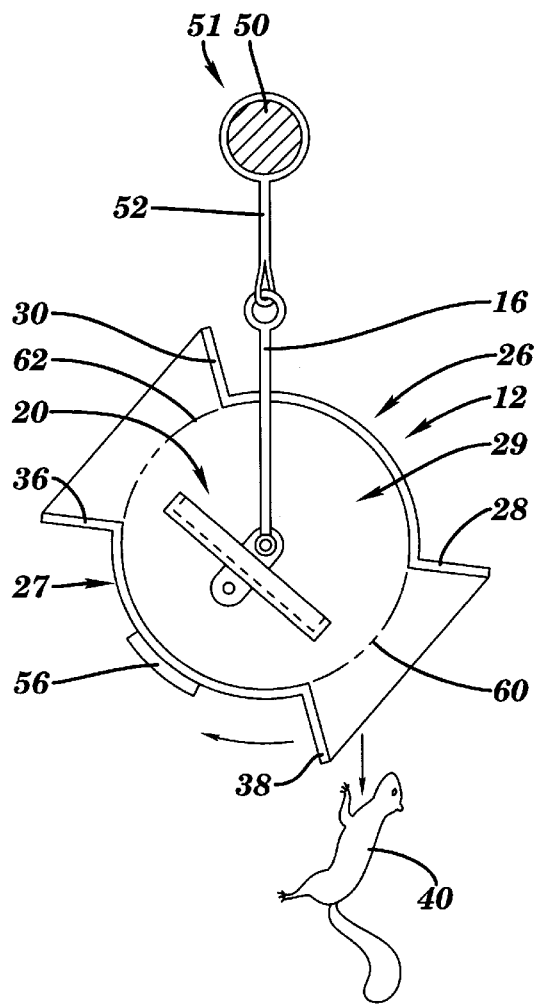
FIG. 4 is a side view of the bird feeder with the housing rotating and with the animal falling off the protruding portion of the housing.
Figure 4:
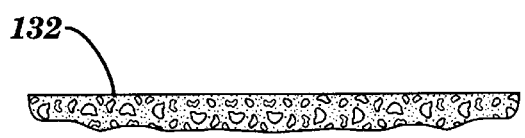

In the preferred embodiment of the present invention, the sides 22 and 24 of the housing 12 are transparent allowing people to clearly see a bird flying into the bird feeder 10, feeding, and flying out of the bird feeder 10 (FIG. 1). Also, it can be very entertaining for a person to watch an animal such as a squirrel 40 trying to reach the bird feed 81. Often a squirrel 40 will climb the trunk 130 of the tree 110, run out on the branch 50 supporting the bird feeder 10, climb down the flexible connector 52 or 54 and support element 16 or 18 toward the bird feeder 10, and jump onto the rotatable housing 12. As illustrated in FIG. 3, as soon as the squirrel 40 contacts any one of the protruding portions 28, 30, 36, or 38, the housing 12 will rotate. In addition, the protruding portions 28, 30, 36, and 38 are made from a hard surfaced slippery material, so that the squirrel 40 is not able to grip the protruding portions 28, 30, 36, and 38 with its claws. As illustrated in FIG. 4, the spinning housing 12 causes the squirrel 40 to fall to the ground surface 132. Thus, the squirrel 40 never reaches the bird feed 81 in the feed tray 20. A squirrel 40 will often climb the trunk 130 of the tree 110 and will repeat the process over and over providing entertainment for the person watching.

In the present invention, the housing 12 is free to rotate at least 360 degrees. When the housing 12 stops spinning, the counterweight 56 attached to the bottom plate 27 causes the housing 12 to always return to the same at rest orientation.

The foregoing description of the present invention has been presented for purposes of illustration and description. It is not intended to be exhaustive or to limit the invention to the precise form disclosed, and many modifications and variations are possible in light of the above teaching. For example, the support elements 16 and 18 may be directly attached to the external support system 51. The housing 12 may have at least one opening 60, and the feed tray 20 may be in a shape other than rectangular. For example, the feed tray 20 may be circular or square in shape. The entire housing 12 may be made from a transparent material, and the housing 12 may be made from suitable materials such as injection molded plastic, steel, aluminum, wood, etc. Such modifications and variations that may be apparent to a person skilled in the art are intended to be included within the scope of this invention as defined by the accompanying claims.

We claim:

1. A bird feeder comprising:
   a support shaft;
   a rotatable housing rotatably attached to the support shaft and including at least two side walls, a top plate having a surface and at least one upwardly protruding portion extending outward at an angle from the surface, and a bottom plate having a surface and at least one downwardly protruding portion extending outward at an angle from the surface; and
   a feed tray contained within the rotatable housing and rigidly attached to the support shaft.

2. The bird feeder according to claim 1, wherein the rotatable housing can rotate greater than 360 degrees.

3. The bird feeder according to claim 1, wherein the rotatable housing further includes an opening formed by one upwardly protruding portion, the two side walls, and by one downwardly protruding portion.

4. The bird feeder according to claim 1, wherein the rotatable housing includes a plurality of openings, wherein each opening is formed by one upward protruding portion, the two side walls, and one downwardly protruding portion.

5. The bird feeder according to claim 1, further including a plurality of support elements rigidly attached to the support shaft for supporting the bird feeder.

6. The bird feeder according to claim 5, wherein each support element further includes a connector for connecting the support element to an external support system.

7. The bird feeder according to claim 6, wherein the connector comprises a flexible connector for connecting the support element to the external support system.

8. The bird feeder according to claim 1, wherein the feed tray further includes a counterweight for maintaining the feed tray in an upright position.

9. The bird feeder according to claim 1, wherein the bottom plate further includes a counterweight for returning the rotatable housing to a predetermined orientation.

10. The bird feeder according to claim 1, wherein the side walls of the rotatable housing are transparent.

11. The bird feeder according to claim 1, wherein the rotatable housing is transparent.

12. A bird feeder comprising:

a support shaft;

a rotatable housing rotatably attached to the support shaft and including at least two side walls, a top plate, and a bottom plate;

a first opening in the rotatable housing formed by a first upwardly protruding portion extending outward at an angle from a surface of the top plate, the two side walls, and by a first downwardly protruding portion extending outward at an angle from a surface of the bottom plate;

a second opening in the rotatable housing formed by a second upwardly protruding portion extending outward at an angle from the surface of the top plate, the two side walls, and by a second downwardly protruding portion extending outward at an angle from the surface of the bottom plate; and a feed tray contained within the rotatable housing and rigidly attached to the support shaft.

13. The bird feeder according to claim 12, wherein the rotatable housing can rotate greater than 360 degrees.

14. The bird feeder according to claim 12, further including a plurality of support elements rigidly attached to the support shaft for supporting the bird feeder.

15. The bird feeder according to claim 14, wherein the connector comprises a flexible connector for connecting the support element to the external support system.

16. The bird feeder according to claim 15, wherein the connector comprises a flexible connector for connecting the support element to the external support system.

17. The bird feeder according to claim 12, wherein the feed tray further includes a counterweight for maintaining the feed tray in an upright position.

18. The bird feeder according to claim 12, wherein the bottom plate further includes a counterweight for returning the rotatable housing to a predetermined orientation.

19. The bird feeder according to claim 12, wherein the side walls of the rotatable housing are transparent.

20. The bird feeder according to claim 12, wherein the rotatable housing is transparent.

21. A bird feeder comprising:

a support shaft;

a rotatable housing rotatably attached to the support shaft and including at least two side walls, a top plate having at least one upwardly protruding portion, and a bottom plate having at least one downwardly protruding portion;

a feed tray contained within the rotatable housing and rigidly attached to the support shaft; and a plurality of support elements rigidly attached to the support shaft, wherein each support element further includes a flexible connector for connecting the support element to an external support system.

22. A bird feeder comprising:

a support shaft;

a rotatable housing rotatably attached to the support shaft and including at least two side walls, a top plate, and a bottom plate;

a first opening in the rotatable housing formed by a first upwardly protruding portion of the top plate, the two side walls, and by a first downwardly protruding portion of the bottom plate;

a second opening in the rotatable housing formed by a second upwardly protruding portion of the top plate, the two side walls, and by a second downwardly protruding portion of the bottom plate; and a feed tray contained within the rotatable housing and rigidly attached to the support shaft; and a plurality of support elements rigidly attached to the support shaft for supporting the bird feeder, wherein each support element further includes a flexible connector for connecting the support element to an external support system.

* * * * *